(12) United States Patent
Finkle et al.

(10) Patent No.: US 8,390,162 B2
(45) Date of Patent: Mar. 5, 2013

(54) RECONFIGURABLE INDUCTIVE TO SYNCHRONOUS MOTOR

(76) Inventors: Louis J. Finkle, Lakewood, CA (US); Andrea Furia, Downey, CA (US)

(*) Notice: Subject to any disclaimer, the term of this patent is extended or adjusted under 35 U.S.C. 154(b) by 771 days.

(21) Appl. No.: 12/610,184

(22) Filed: Oct. 30, 2009

(65) Prior Publication Data

US 2011/0101811 A1  May 5, 2011

(51) Int. Cl.
*H02K 21/12* (2006.01)
(52) U.S. Cl. ............... 310/156.24; 310/156.38; 310/191
(58) Field of Classification Search ............ 310/156.24, 310/156.36–156.38, 156.43, 156.48, 191
See application file for complete search history.

(56) References Cited

U.S. PATENT DOCUMENTS

| | | | |
|---|---|---|---|
| 2,209,558 A | 7/1940 | Bing et al. | |
| 2,243,616 A | 5/1941 | Bing et al. | |
| 2,287,286 A | 6/1942 | Bing et al. | |
| 2,558,540 A | 6/1951 | Clos | |
| 4,151,431 A | 4/1979 | Johnson | |
| 4,508,998 A | 4/1985 | Hahn | |
| 5,594,289 A | 1/1997 | Minato | |
| 8,072,108 B2 * | 12/2011 | Finkle et al. | 310/156.24 |
| 8,288,908 B2 * | 10/2012 | Finkle et al. | 310/156.24 |
| 2004/0041481 A1 | 3/2004 | Kuo | |
| 2006/0038457 A1 | 2/2006 | Miyata et al. | |
| 2007/0228856 A1 | 10/2007 | Bates et al. | |
| 2011/0101812 A1 * | 5/2011 | Finkle et al. | 310/156.24 |

FOREIGN PATENT DOCUMENTS

| | | |
|---|---|---|
| JP | 62-117558 | 11/1988 |
| WO | WO 88/05976 | 8/1988 |

* cited by examiner

*Primary Examiner* — Tran N. Nguyen
*Assistant Examiner* — David Scheuermann
(74) *Attorney, Agent, or Firm* — Kenneth L. Green (57) ABSTRACT

A reconfigurable electric motor includes rotatable permanent magnets in a rotor, the magnets having a first position producing a weak magnetic field and a second position producing a strong magnetic field. The motor is reconfigurable from an asynchronous induction motor at startup into a synchronous motor for efficient operation. The motor includes a squirrel cage for induction motor operation at startup with the permanent magnets positioned to product the weak magnetic field to not interfere with the startup. When the motor reaches sufficient RPM, the permanent magnets rotate to produce a strong magnetic field for high efficiency synchronous operation. The permanent magnets are magnetically biased to come to rest in the weak magnetic field position and a centrifugal mechanism holds the magnets in the weak magnetic field position until sufficient RPM are reached for transition to synchronous operation.

10 Claims, 7 Drawing Sheets

RECONFIGURABLE INDUCTIVE TO SYNCHRONOUS MOTOR

BACKGROUND OF THE INVENTION

The present invention relates to electric motors and in particular to rotatable permanent magnets in a rotor to reconfigure the motor from an asynchronous induction motor at startup into a synchronous motor for efficient operation.

A preferred form of electric motors are brushless AC induction motors. The rotors of induction motors include a cage (or squirrel cage resembling a "hamster wheel") rotating inside the stator. The cage comprises axially running bars angularly spaced apart on the outer perimeter of the rotor. An AC current provided to the stator introduces a rotating stator magnetic field in the stator, and the rotating field inductively induces current in the bars. The current induced in the bars then cooperate with the same stator magnetic field to produce torque and thus rotation of the motor.

The introduction of current into the bars requires that the bars are not moving (or rotating) synchronously with the rotating stator magnetic field because electromagnetic induction requires relative motion between a magnetic field and a conductor in the field. As a result the rotor must slip with respect to the rotating stator magnetic field to produce torque and the induction motors are thus asynchronous motors.

Unfortunately, low power induction motors are not highly efficient, and lose efficiency under reduced loads because the amount of power consumed by the stator remains constant at low loads.

One approach to improving induction motor efficiency has been to add permanent magnets to the rotor. The motor initially starts in the same manner as a typical induction motor, but as the motor reached its operating speed, the stator magnetic field cooperates with the permanent magnets to enter synchronous operation. Unfortunately, the permanent magnets are limited in size because if the permanent magnets are too large, they prevent the motor from starting. Such size limitation limits the benefit obtained from the addition of the permanent magnets.

BRIEF SUMMARY OF THE INVENTION

The present invention addresses the above and other needs by providing a reconfigurable electric motor which includes rotatable permanent magnets in a rotor, the magnets having a first position producing a weak magnetic field and a second position producing a strong magnetic field. The motor is reconfigurable from an asynchronous induction motor at startup into a synchronous motor for efficient operation. The motor includes a squirrel cage for induction motor operation at startup with the permanent magnets positioned to produce the weak magnetic field to not interfere with the startup. When the motor reaches sufficient RPM, the permanent magnets rotate to produce a strong magnetic field for high efficiency synchronous operation. The permanent magnets are magnetically biased to come to rest in the weak magnetic field position and a centrifugal mechanism holds the magnets in the weak magnetic field position until sufficient RPM are reached for transition to synchronous operation.

In accordance with one aspect of the invention, there is provided a reconfigurable brushless AC electric motor, starting in asynchronous mode and transitioning after startup to a more efficient synchronous mode. The motor includes a stator receiving an AC power signal and generating a rotating stator magnetic field and a rotor. The rotor includes bars forming a squirrel cage structure for inductively cooperation with the rotating stator magnetic field providing the asynchronous mode of operation for motor startup and at least one rotatable permanent magnet for efficient synchronous operation. The permanent magnet resides inside the rotor and cooperates with pole pieces. The permanent magnet has a first position resulting in a weak magnetic field to allow the inductive motor startup and is rotatable to a second position resulting in a strong magnetic field for cooperation with the rotating stator magnetic field for the efficient synchronous operation. A centrifugal latching mechanism retains the permanent magnet in the weak magnetic field position for startup and until sufficient RPM is reached to transition to synchronous operation.

BRIEF DESCRIPTION OF THE SEVERAL VIEWS OF THE DRAWING

The above and other aspects, features and advantages of the present invention will be more apparent from the following more particular description thereof, presented in conjunction with the following drawings wherein.

Corresponding reference characters indicate corresponding components throughout the several views of the drawings.

DETAILED DESCRIPTION OF THE INVENTION

The following description is of the best mode presently contemplated for carrying out the invention. This description is not to be taken in a limiting sense, but is made merely for the purpose of describing one or more preferred embodiments of the invention. The scope of the invention should be determined with reference to the claims.

Figures 1A, 1B, 2:
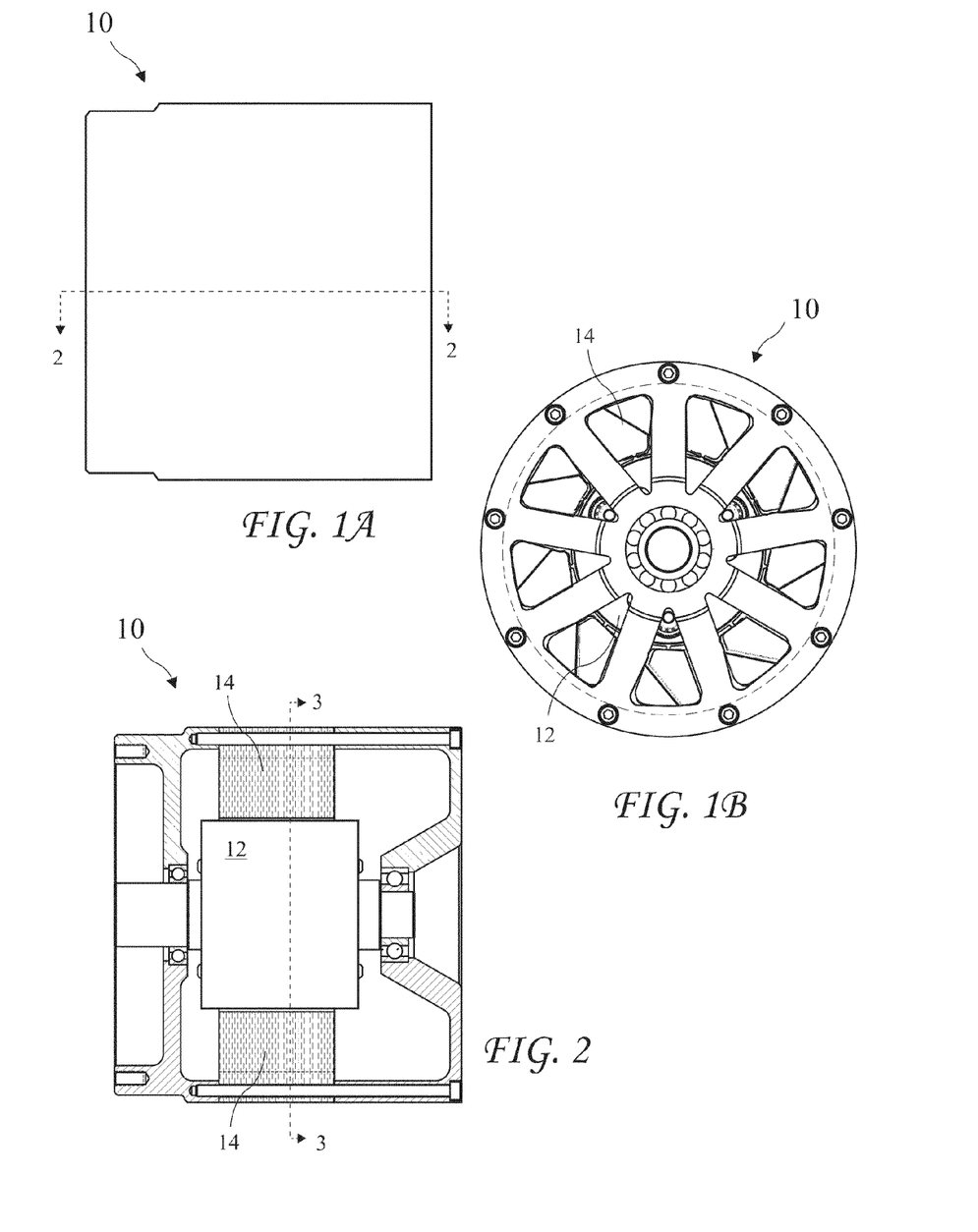
FIG. 1A is a side view of a reconfigurable electric motor according to the present invention.
FIG. 1B is an end view of the reconfigurable electric motor.
FIG. 2 is a cross-sectional view of the reconfigurable electric motor according to the present invention taken along line 2-2 of FIG. 1A.

A side view of a reconfigurable electric motor 10 according to the present invention is shown in FIG. 1A, an end view of the reconfigurable electric motor 10 is shown in FIG. 1B, and a cross-sectional view of the reconfigurable electric motor 10 taken along line 2-2 of FIG. 1A is shown in FIG. 2. The motor 20 includes stator windings 14 and a rotor 12 residing inside the stator windings 14. The motor 10 is a brushless AC inductive motor including at least one permanent magnet 16 (see FIGS. 3-7) in the rotor 12, which magnet 16 may be adjusted to provide a weak magnetic field at startup for initial asynchronous operation and a strong magnetic field after startup for efficient synchronous operation.

Figures 3, 4, 5:
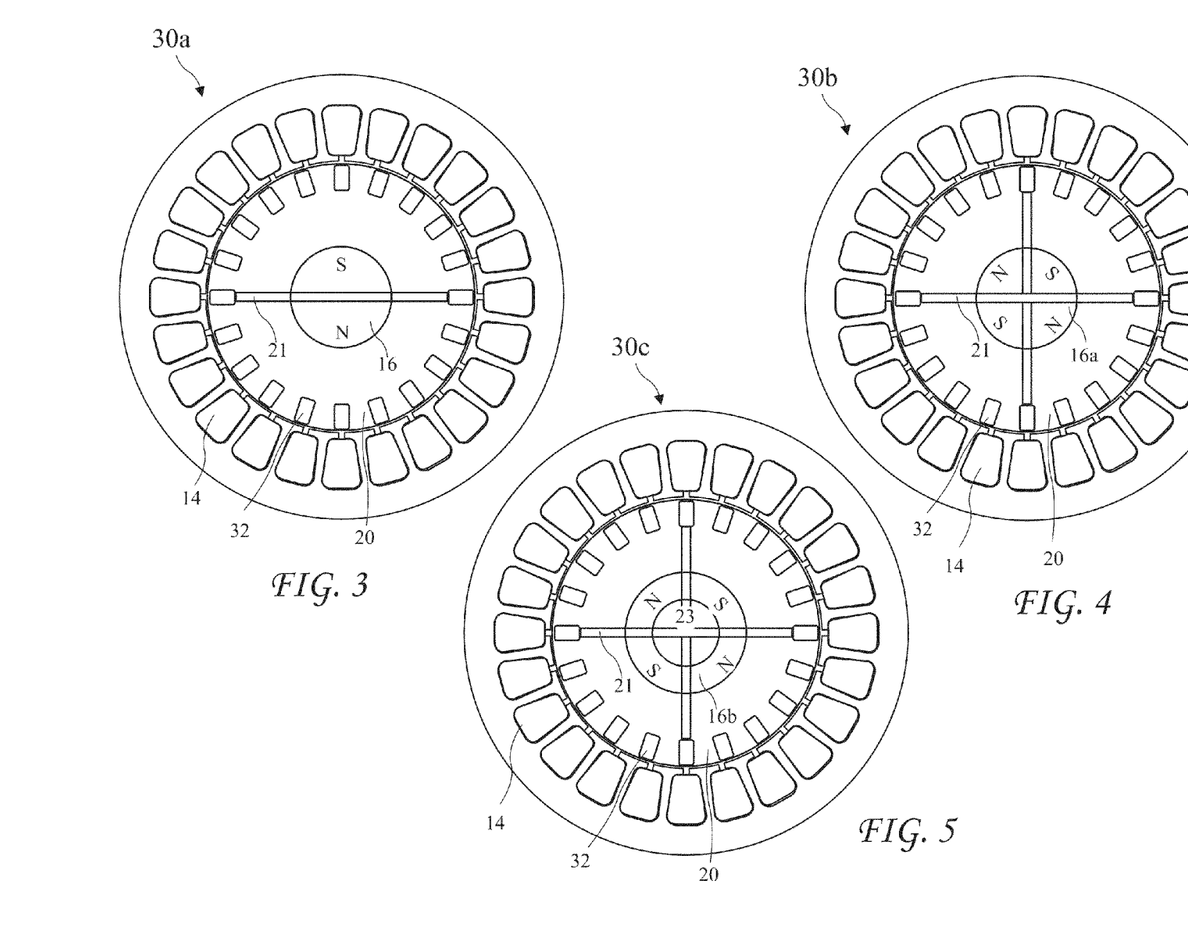
FIG. 3 is a cross-sectional view of the reconfigurable electric motor according to the present invention taken along line 3-3 of FIG. 2 showing an embodiment of the present invention with a single permanent magnet in a radially aligned rotor configuration.
FIG. 4 is a cross-sectional view of the reconfigurable electric motor according to the present invention taken along line 3-3 of FIG. 2 showing an embodiment of the present invention with a single four pole permanent magnet in a radially aligned rotor configuration.
FIG. 5 is a cross-sectional view of the reconfigurable electric motor according to the present invention taken along line 3-3 of FIG. 2 showing an embodiment of the present invention with a single four pole hollow permanent magnet in a radially aligned rotor configuration.

A cross-sectional view of the reconfigurable electric motor 10 taken along line 3-3 of FIG. 2 showing a first embodiment of the motor 10 comprising a two motor 30a with a single two pole rotatable Interior Permanent Magnet (IPM) 16 in the rotor 12 is shown in FIG. 3. The magnet 16 is shown with air gaps 21 on each side of the magnet 16 splitting the North (N) and South (S) poles of the magnet 16 in a radially aligned configuration. Bars 32 of a squirrel cage element for inductive operation are angularly spaced apart around the outer radius of the rotor 12 reaching the length of the rotor 12. The bar may be straight or may be twisted to reduce noise among other benefits. The magnet 16 and rods 32 are carried by rotor pole pieces 20 separated by the air gaps 21. The pole pieces 20 are preferably constructed from laminated layers of insulated magnetically conducting material, for example, iron or steel.

A cross-sectional view of the reconfigurable electric motor 10 according to the present invention taken along line 3-3 of FIG. 2 showing a second embodiment of the motor 10 comprising a four pole motor 30b with a single four pole permanent magnet 16a in a radially aligned rotor configuration is shown in FIG. 4. The pole piece 20 is divided into four quarter sections with air gaps 21 between adjacent sections. The motor 30b is otherwise like the motor 30a.

A cross-sectional view of the reconfigurable electric motor 10 according to the present invention taken along line 3-3 of FIG. 2 showing a third embodiment of the motor 10 comprising a four pole motor 30c with a single hollow four pole permanent magnet 16b in a radially aligned rotor configuration is shown in FIG. 5. A steel shaft 23 runs through the center of the hollow magnet 16b. The motor 30c is otherwise like the motor 30b.

Figures 6, 7, 8:
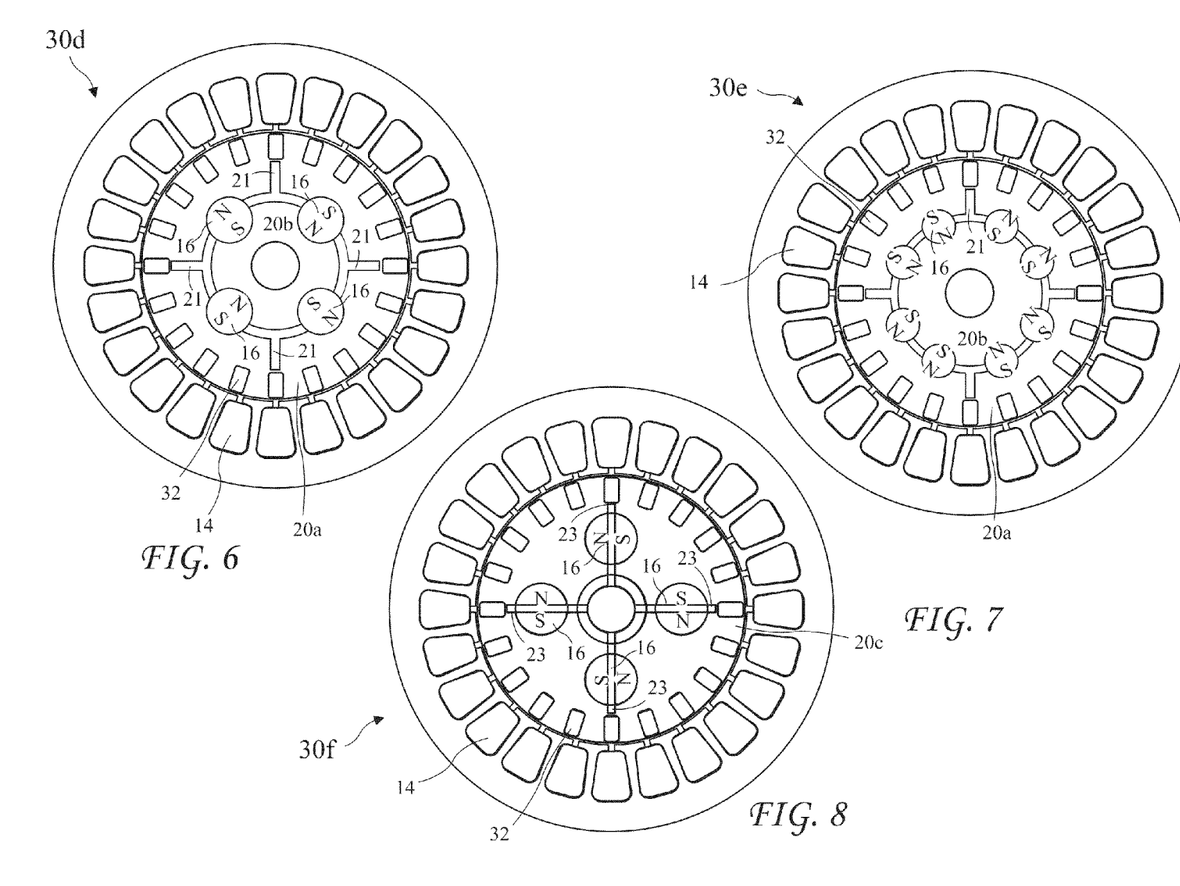
FIG. 6 is a cross-sectional view of the reconfigurable electric motor according to the present invention taken along line 3-3 of FIG. 2 showing an embodiment of the present invention with four permanent magnets in a radially aligned rotor configuration.
FIG. 7 is a cross-sectional view of the reconfigurable electric motor according to the present invention taken along line 3-3 of FIG. 2 showing an embodiment of the present invention with four pairs of permanent magnets in a radially aligned rotor configuration.
FIG. 8 is a cross-sectional view of the reconfigurable electric motor according to the present invention taken along line 3-3 of FIG. 2 showing an embodiment of the present invention with four permanent magnets in a flux squeeze rotor configuration.

A cross-sectional view of the reconfigurable four pole electric motor 10 according to the present invention taken along line 3-3 of FIG. 2 showing a fourth embodiment of the motor 10 comprising a four pole motor 30d with four two pole permanent magnets 16 angularly spaced apart in a radially aligned rotor configuration is shown in FIG. 6. The pole piece comprises four outer pole pieces 20a and a single hollow center pole piece 20b. The magnets 16 are sandwiched radially between the center pole piece 20b and the outer pole pieces 20a and air gaps 21 separate each outer pole piece 20a from an adjacent outer pole piece 20a and separate the center pole piece 20b from the outer pole pieces 20a. Bars 32 of the squirrel cage element for inductive operation are angularly spaced apart around the outer radius of the rotor 12 reaching the length of the rotor 12. The bar may be straight or may be twisted to reduce noise among other benefits. The pole pieces 20a and 20b are preferably constructed from laminated layers of insulated magnetically conducting material, for example, iron or steel.

A cross-sectional view of the reconfigurable four pole electric motor 10 according to the present invention taken along line 3-3 of FIG. 2 showing a fifth embodiment of the motor 10 comprising a four pole motor 30e with four pairs of two pole permanent magnets 16 angularly spaced apart in a radially aligned rotor configuration is shown in FIG. 7. Other similar embodiments may include groups of magnets comprising four groups of three or more magnets. The motor 30e is otherwise like the motor 30d.

A cross-sectional view of the reconfigurable four pole electric motor 10 according to the present invention taken along line 3-3 of FIG. 2 showing a sixth embodiment of the motor 10 comprising a four pole motor 30f with four two pole permanent magnets 16 angularly spaced apart in a flux squeeze rotor configuration is shown in FIG. 8. The four magnets 16 reside angularly between four angularly spaced apart pole pieces 20c. The motor 30f is otherwise like the motor 30d.

Figure 9A:
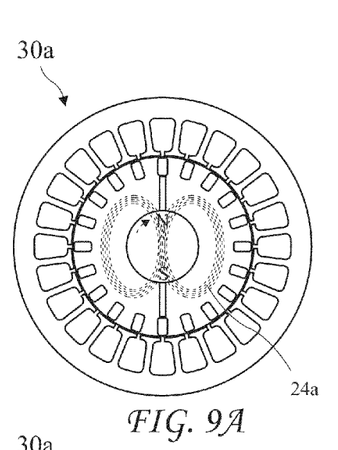
FIG. 9A is a cross-sectional view of the reconfigurable electric motor according to the present invention taken along line 3-3 of FIG. 2 showing an embodiment of the present invention with a single permanent magnet rotated to provide a minimum magnetic field in a radially aligned rotor configuration.

A cross-sectional view of the motor 30a (see FIG. 3) taken along line 3-3 of FIG. 2 with the single two pole permanent magnet 16 rotated to provide a minimum (or weak) magnetic field 24a is shown in FIG. 9A. The weakened magnetic field 24a does not interfere with starting the motor 30a in an inductive mode for initial asynchronous operation.

Figure 9B:
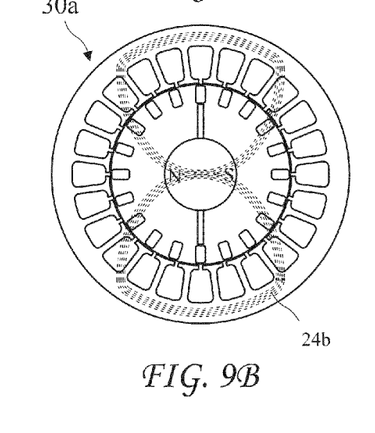
FIG. 9B is a cross-sectional view of the reconfigurable electric motor according to the present invention taken along line 3-3 of FIG. 2 showing an embodiment of the present invention with a single permanent magnet rotated to provide a maximum magnetic field in a radially aligned rotor configuration.

A cross-sectional view of the motor 30a taken along line 3-3 of FIG. 2 with the single two pole permanent magnet 16 rotated to provide a maximum (or strong) magnetic field is shown in FIG. 9B. The strong magnetic field would interfere with starting the motor 30a, but provides more efficient operation in a synchronous more after startup of the motor 30a.

Figure 10A:
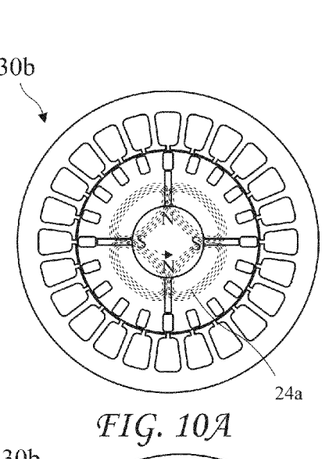
FIG. 10A is a cross-sectional view of the reconfigurable electric motor according to the present invention taken along line 3-3 of FIG. 2 showing an embodiment of the present invention with a single four pole permanent magnet rotated to provide a minimum magnetic field in a radially aligned rotor configuration.

A cross-sectional view of the motor 30b (see FIG. 4) taken along line 3-3 of FIG. 2 with the single four pole permanent magnet 16a rotated to provide a minimum (or weak) magnetic field 24a is shown in FIG. 10A. The weakened magnetic field 24a does not interfere with starting the motor in an inductive mode for initial asynchronous operation.

Figure 10B:
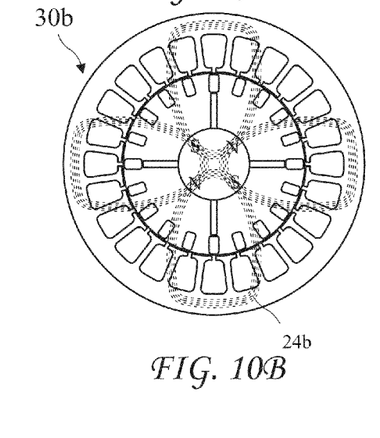
FIG. 10B is a cross-sectional view of the reconfigurable electric motor according to the present invention taken along line 3-3 of FIG. 2 showing an embodiment of the present invention with a single four pole permanent magnet rotated to provide a maximum magnetic field in a radially aligned rotor configuration.

A cross-sectional view of the motor 30b taken along line 3-3 of FIG. 2 with the single four pole permanent magnet 16a rotated to provide a maximum (or strong) magnetic field is shown in FIG. 10B. The strong magnetic field would interfere with starting the motor 30b, but provides more efficient operation in a synchronous more after startup of the motor 30b.

Figure 11A:
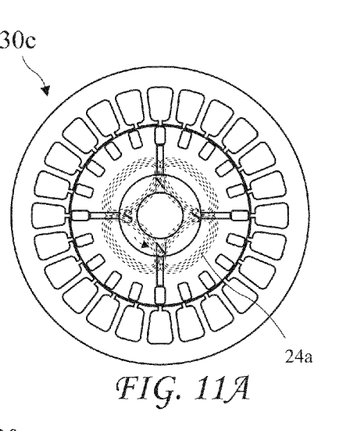
FIG. 11A is a cross-sectional view of the reconfigurable electric motor according to the present invention taken along line 3-3 of FIG. 2 showing an embodiment of the present invention with a single hollow four pole permanent magnet rotated to provide a minimum magnetic field in a radially aligned rotor configuration.

A cross-sectional view of the motor 30c (see FIG. 5) taken along line 3-3 of FIG. 2 with the single hollow four pole permanent magnet 16b rotated to provide a minimum (or weak) magnetic field 24a is shown in FIG. 11A. The weakened magnetic field 24a does not interfere with starting the motor in an inductive mode for initial asynchronous operation.

Figure 11B:
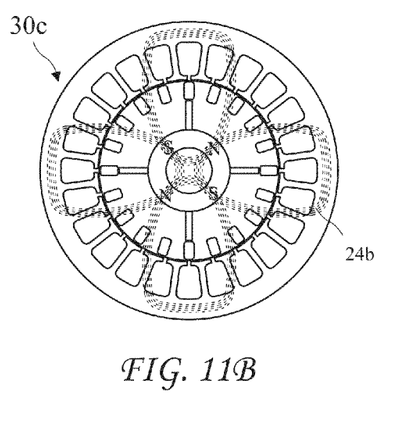
FIG. 11B is a cross-sectional view of the reconfigurable electric motor according to the present invention taken along line 3-3 of FIG. 2 showing an embodiment of the present invention with a single hollow four pole permanent magnet rotated to provide a maximum magnetic field in a radially aligned rotor configuration.

A cross-sectional view of the motor 30c taken along line 3-3 of FIG. 2 with the single hollow four pole permanent magnet 16b rotated to provide a maximum (or strong) magnetic field is shown in FIG. 11B. The strong magnetic field would interfere with starting the motor 30c, but provides more efficient operation in a synchronous more after startup of the motor 30c.

Figure 12A:
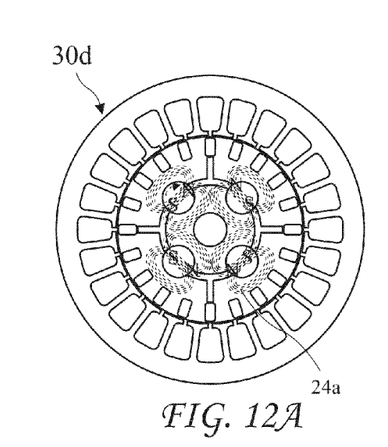
FIG. 12A is a cross-sectional view of the reconfigurable electric motor according to the present invention taken along line 3-3 of FIG. 2 showing an embodiment of the present invention with four permanent magnets rotated to provide a minimum magnetic field in a radially aligned rotor configuration.

A cross-sectional view of the motor 30d (see FIG. 6) taken along line 3-3 of FIG. 2 with the four two pole permanent magnets 16 rotated to provide a minimum (or weak) magnetic field 24a is shown in FIG. 12A. The weakened magnetic field 24a does not interfere with starting the motor 30d in an inductive mode for initial asynchronous operation.

Figure 12B:
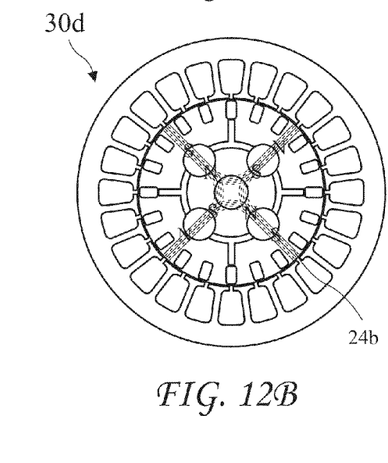
FIG. 12B is a cross-sectional view of the reconfigurable electric motor according to the present invention taken along line 3-3 of FIG. 2 showing an embodiment of the present invention with four permanent magnets rotated to provide a maximum magnetic field in a radially aligned rotor configuration.

A cross-sectional view of the motor 30d taken along line 3-3 of FIG. 2 with the four two pole permanent magnets 16 rotated to provide a maximum (or strong) magnetic field is shown in FIG. 12B. The strong magnetic field would interfere with starting the motor 30d, but provides more efficient operation in a synchronous more after startup of the motor 30d.

Figure 13A:
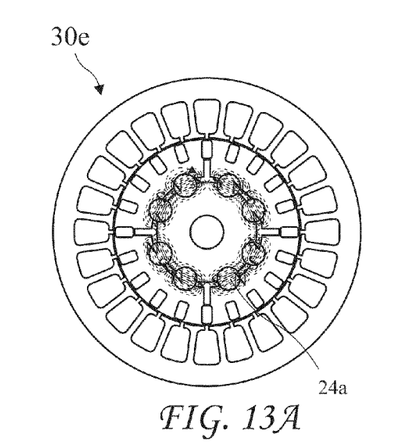
FIG. 13A is a cross-sectional view of the reconfigurable electric motor according to the present invention taken along line 3-3 of FIG. 2 showing an embodiment of the present invention with four pairs of permanent magnets rotated to provide a minimum magnetic field in a radially aligned rotor configuration.

A cross-sectional view of the motor 30e (see FIG. 7) taken along line 3-3 of FIG. 2 with the four pairs of two pole permanent magnets 16 rotated to provide a minimum (or weak) magnetic field 24a is shown in FIG. 13A. The weakened magnetic field 24a does not interfere with starting the motor 30e in an inductive mode for initial asynchronous operation.

Figure 13B:
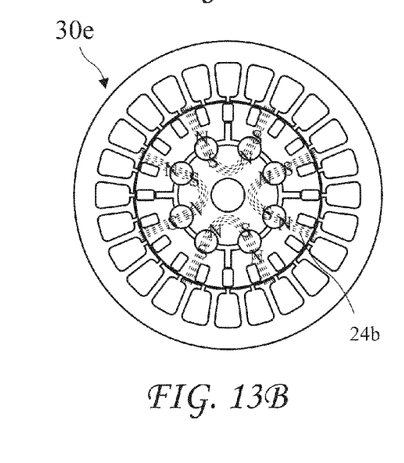
FIG. 13B is a cross-sectional view of the reconfigurable electric motor according to the present invention taken along line 3-3 of FIG. 2 showing an embodiment of the present invention with four pairs of permanent magnets rotated to provide a maximum magnetic field in a radially aligned rotor configuration.

A cross-sectional view of the motor 30e taken along line 3-3 of FIG. 2 with the four pairs of two pole permanent magnets 16 rotated to provide a maximum (or strong) magnetic field is shown in FIG. 13B. The strong magnetic field would interfere with starting the motor 30e, but provides more efficient operation in a synchronous more after startup of the motor 30e.

Figure 14A:
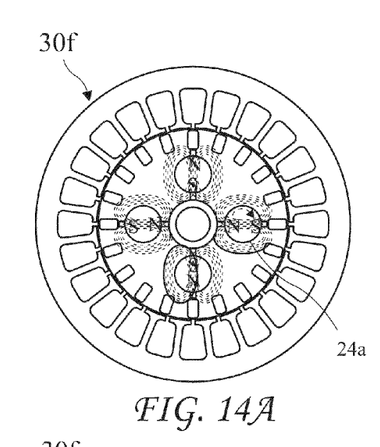
FIG. 14A is a cross-sectional view of the reconfigurable electric motor according to the present invention taken along line 3-3 of FIG. 2 showing an embodiment of the present invention with four permanent magnets rotated to provide a minimum magnetic field in a flux squeeze rotor.

A cross-sectional view of the motor 30f (see FIG. 8) taken along line 3-3 of FIG. 2 with the four two pole permanent magnets 16 rotated to provide a minimum (or weak) magnetic field 24a in the flux squeeze rotor configuration is shown in FIG. 14A. The weakened magnetic field 24a does not interfere with starting the motor 30f in an inductive mode for initial asynchronous operation.

Figure 14B:
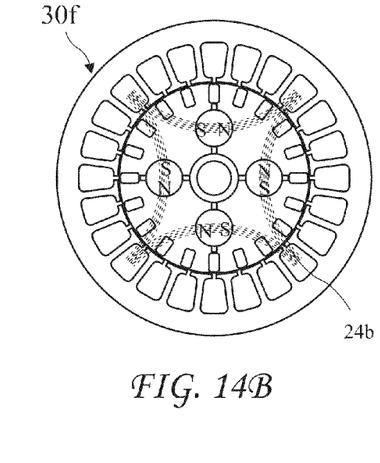
FIG. 14B is a cross-sectional view of the reconfigurable electric motor according to the present invention taken along line 3-3 of FIG. 2 showing an embodiment of the present invention with four permanent magnets rotated to provide a maximum magnetic field in a flux squeeze rotor.

A cross-sectional view of the motor 30f taken along line 3-3 of FIG. 2 with the four two pole permanent magnets 16 rotated to provide a maximum (or strong) magnetic field in the flux squeeze rotor configuration is shown in FIG. 14B. The strong magnetic field would interfere with starting the motor 30f, but provides more efficient operation in a synchronous more after startup of the motor 30f.

Figures 15A, 16A:
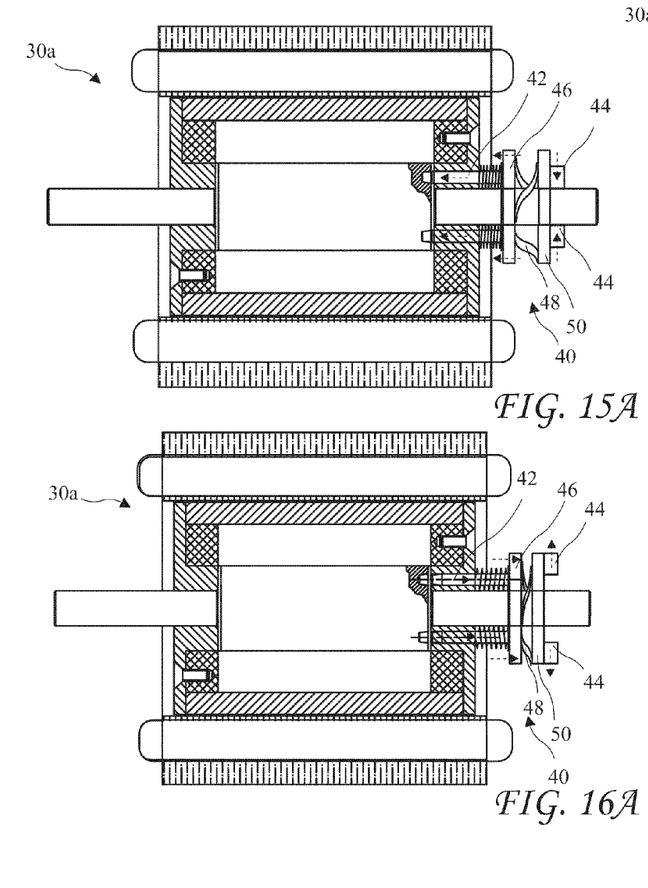
FIG. 15A is a side cross-sectional view of the reconfigurable electric motor according to the present invention with a centrifugal latching mechanism holding a single permanent magnet in a minimum magnetic field position.
FIG. 16A is a side cross-sectional view of the reconfigurable electric motor according to the present invention with the centrifugal latching mechanism releasing the single permanent magnet in a maximum magnetic field position.
Figure 15B:
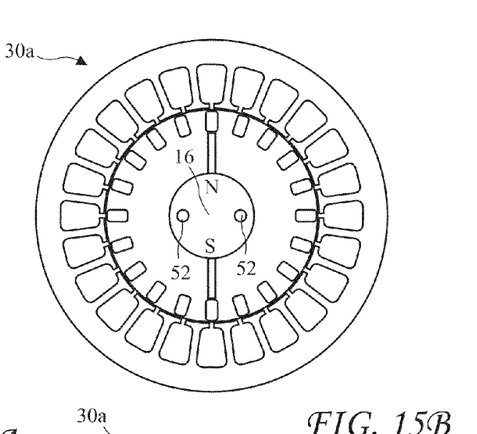
FIG. 15B is an end view of the reconfigurable electric motor according to the present invention with the centrifugal latching mechanism holding the single permanent magnet in a minimum magnetic field position.
Figure 16B:
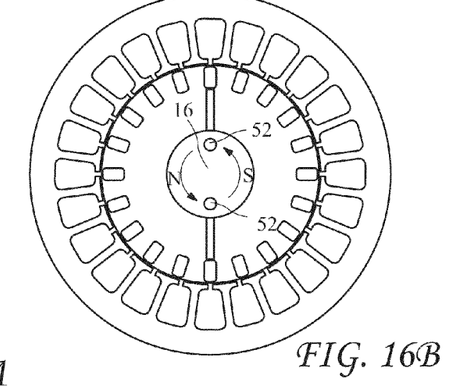
FIG. 16B is an end view of the reconfigurable electric motor according to the present invention with the centrifugal latching mechanism releasing the single permanent magnet in a maximum magnetic field position.

A side cross-sectional view of the motor 30a (see FIG. 3) with a centrifugal latching mechanism 40 holding the single permanent magnet 16 in a minimum magnetic field position (see FIG. 9A) is shown in FIG. 15A and a corresponding end view of the motor 30a with the centrifugal latching mechanism holding the single permanent magnet in the minimum magnetic field position (see FIG. 9A) is shown in FIG. 15B. A second side cross-sectional view of the motor 30a with the centrifugal latching mechanism 40 having released the single permanent magnet 16 to the maximum magnetic field position is shown in FIG. 16A and a corresponding end view of the motor 30a with the centrifugal latching mechanism having released the single permanent magnet to the maximum magnetic field position is shown in FIG. 16B. The centrifugal latching mechanism 40 includes weights 44, rotating plate 50, spring disk 48, sliding plate 46, pins 42, and pin seats 52. The weights 44 and spring disk 48 are selected so that at an appropriate RPM the weights 44 move outward causing the spring disk 48 to snap from a first extended position as in FIG. 15A to a retraced position as in FIG. 16A thereby retracting the pins 42 from seats 52 releasing the magnet 16.

The magnet 16 is magnetically urged to the weak magnetic field position when the motor 30a is stationary, and the centrifugal latching mechanism 40 also urges the pins 42 into the pin seats 52 when the motor 30a is stationary. As a result, the motor 30a returns to the weak magnet mode whenever the motor 30a stops allowing the motor to startup as an asynchronous induction motor. When the motor 30a reaches sufficient RPM, the centrifugal latching mechanism 40 pulls the pins 42 from the pin seats 52 releasing the magnet 16. At sufficient RPM, the magnetic fields in the motor 30a urge the permanent magnet 16 to rotate 90 degrees to the strong magnet position, thus providing efficient synchronous operation.

An example of a suitable centrifugal latching mechanism is the Synchrosnap® Centrifugal mechanism made by TORQ Corp. In Bedford, Ohio. For use in the present invention, the Synchrosnap® Centrifugal mechanism is only slightly modified to actuate the pins 42 instead of providing an electrical switch function.

Figure 17A:
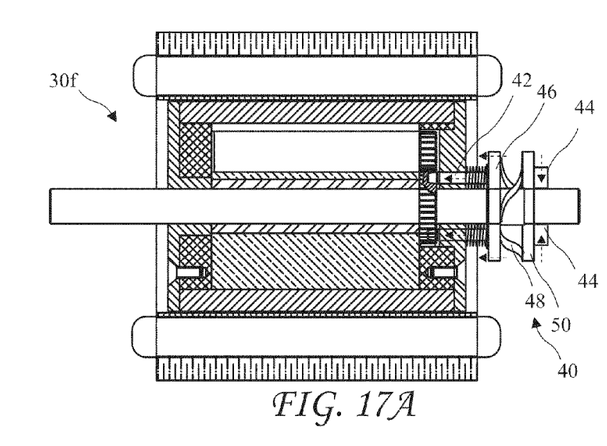
FIG. 17A is a side cross-sectional view of the reconfigurable electric motor according to the present invention with the centrifugal latching mechanism holding four permanent magnets in a minimum magnetic field position.
Figure 17B:
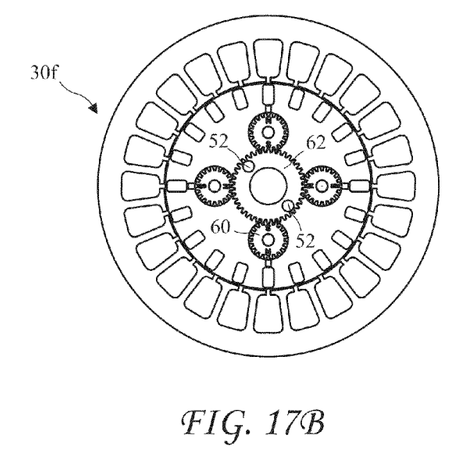
FIG. 17B is an end view of the reconfigurable electric motor according to the present invention with the centrifugal latching mechanism holding the four permanent magnets in a minimum magnetic field position.
Figure 18A:
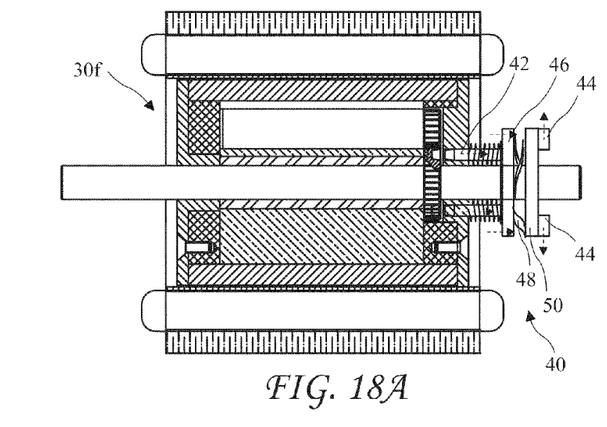
FIG. 18A is a side cross-sectional view of the reconfigurable electric motor according to the present invention with the centrifugal latching mechanism releasing the four permanent magnets in a maximum magnetic field position.
Figure 18B:
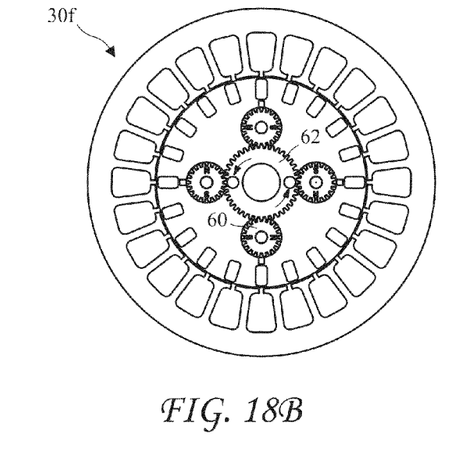
FIG. 18B is an end view of the reconfigurable electric motor according to the present invention with the centrifugal latching mechanism releasing the four permanent magnets in a maximum magnetic field position.

A second example of the apparatus for switching between a weak magnetic field and a strong magnetic field applied to the motor 30f (see FIG. 8) is shown in FIGS. 17A (side view weak field), 17B (end view weak field), 18A (side view strong field), and 18B (end view strong field). The four magnets 16 of the motor 30f each are attached to a small gear 60, and the small gears all engage a larger gear 62, whereby all of the magnets 16 remain rotationally aligned. The pins 42 engage the pin seats 52 in the large gear 62 when the motor 30f is at rest, and when the motor 30f reaches sufficient RPM, the centrifugal latching mechanism 40 pulls the pins 42 from the pin seats 52 releasing the magnet 16. As with the motor 30a, the permanent magnets 16 of the motor 30f are magnetically urged to the weak field position (see FIG. 14A) when the motor 30f is stopped, and are magnetically urged to the strong field position (see FIG. 14B) at RPM sufficient for synchronous operation.

While the invention herein disclosed has been described by means of specific embodiments and applications thereof, numerous modifications and variations could be made thereto by those skilled in the art without departing from the scope of the invention set forth in the claims.

We claim:

1. A reconfigurable brushless AC electric motor, operating in both asynchronous and synchronous modes, the motor comprising:
    a stator receiving an AC power signal and generating a rotating stator magnetic field;
    a rotor comprising:
        inductive elements for cooperation with the rotating stator magnetic field providing the asynchronous mode of operation for motor startup; and
        at least one rotatable permanent magnet residing inside the rotor and in cooperation with pole pieces and having a first position with poles of the permanent magnets aligned with gaps between the pole pieces to allow the inductive motor startup and rotatable to a second position with the poles of the permanent magnets aligned with the pole pieces for cooperation with the rotating stator magnetic field for efficient synchronous operation.

2. The electric motor of claim 1, wherein the at least one permanent magnet comprises a single permanent magnet residing coaxial with the rotor.

3. The electric motor of claim 1, wherein the at least one permanent magnet comprises a single hollow permanent magnet residing coaxial with the rotor.

4. The electric motor of claim 1, wherein the at least one permanent magnet comprises four angularly spaced apart parallel magnets in a radially aligned rotor configuration.

5. The electric motor of claim 1, wherein the at least one permanent magnet comprises four spaced apart parallel groups of at least two magnets in a radially aligned rotor configuration.

6. The electric motor of claim 1, wherein the at least one permanent magnet comprises four spaced apart parallel pairs of magnets in a radially aligned rotor configuration.

7. The electric motor of claim 1, wherein the at least one permanent magnet comprises four spaced apart parallel magnets in a flux squeeze configuration.

8. The electric motor of claim 1, further including a centrifugal latching mechanism for retaining the at least one magnet in a minimum magnetic field position until sufficient RPM is reached for transition to synchronous operation.

9. A reconfigurable brushless AC electric motor, starting in asynchronous mode and transitioning after startup to a more efficient synchronous mode, the motor comprising:
    a stator receiving an AC power signal and generating a rotating stator magnetic field;
    a rotor comprising:
        inductive elements for cooperation with the rotating stator magnetic field providing the asynchronous mode of operation for motor startup;
        at least one rotatable permanent magnet residing inside the rotor and in cooperation with pole pieces and having a first position with poles of the permanent magnets aligned with gaps between the pole pieces to allow the inductive motor startup and rotatable to a second position with the poles of the permanent magnets aligned with the pole pieces for cooperation with the rotating stator magnetic field for efficient synchronous operation; and
    a centrifugal latching mechanism for retaining the at least one magnet in the weak magnetic field position until sufficient RPM is reached to transition to synchronous operation.

10. A reconfigurable brushless AC electric motor, starting in asynchronous mode and transitioning after startup to a more efficient synchronous mode, the motor comprising:
    a stator receiving an AC power signal and generating a rotating stator magnetic field;
    a rotor comprising:
        bars forming a squirrel cage structure for inductive cooperation with the rotating stator magnetic field providing the asynchronous mode of operation for motor startup;
        at least one rotatable permanent magnet residing inside the rotor and in cooperation with pole pieces and having a first position with poles of the permanent magnets aligned with gaps between the pole pieces to allow the inductive motor startup and rotatable to a second position with the poles of the permanent magnets aligned with the pole pieces for cooperation with the rotating stator magnetic field for efficient synchronous operation; and
    a centrifugal latching mechanism for retaining the at least one permanent magnet in the weak magnetic field position until sufficient RPM is reached to transition to synchronous operation.

* * * * *